(12) United States Patent
Roe

(10) Patent No.: US 10,282,376 B2
(45) Date of Patent: May 7, 2019

(54) SEMI-STRUCTURED SPATIAL DATA CONVERSION

(71) Applicant: The United States of America, as represented by the Secretary of the Navy, Washington, DC (US)

(72) Inventor: Marvin W. Roe, Slidell, LA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 434 days.

(21) Appl. No.: 15/348,605

(22) Filed: Nov. 10, 2016

(65) Prior Publication Data

US 2017/0132236 A1    May 11, 2017

Related U.S. Application Data

(60) Provisional application No. 62/253,343, filed on Nov. 10, 2015.

(51) Int. Cl.
*G06F 16/00* (2019.01)
*G06F 16/84* (2019.01)

(52) U.S. Cl.
CPC .................................. *G06F 16/88* (2019.01)

(58) Field of Classification Search
None
See application file for complete search history.

(56) References Cited

U.S. PATENT DOCUMENTS

| 2007/0112714 A1* | 5/2007 | Fairweather | G06F 8/427 706/46 |
| 2013/0238290 A1* | 9/2013 | Angevine | G06T 17/05 703/1 |
| 2015/0350844 A1* | 12/2015 | Agarwal | H04W 4/029 455/456.2 |

\* cited by examiner

*Primary Examiner* — Anhtai V Tran
(74) *Attorney, Agent, or Firm* — US Naval Research Laboratory; William P. Ladd

(57) ABSTRACT

Embodiments relate to converting semi-structured spatial data. Initially, semi-structured spatial data is recursively traversed to determine a dynamically nested structure. The dynamically nested structure is translated into an application specific layer structure based on feature type grouping and display capabilities of a geographic information system (GIS) application. Next, an input symbology is determined for each feature in the semi-structured spatial data. The input symbology of each feature is analyzed to determine an application symbology for each map layer in the GIS application. A spatial database is created for the GIS application based on the application specific layer structure. The features are translated from the semi-structured spatial data into the spatial database, and the application symbology of each map layer is used to render the features in the GIS application.

15 Claims, 13 Drawing Sheets

SEMI-STRUCTURED SPATIAL DATA CONVERSION

CROSS-REFERENCE TO RELATED APPLICATIONS

This Application is a non-provisional application claiming priority to provisional application 62/253,343 filed on Nov. 10, 2015, under 35 USC 119(e). The entire disclosure of the provisional application is incorporated herein by reference.

BACKGROUND

Keyhole Markup Language (KML) is used by geospatial display software like Google Earth, Google Maps, etc. Like Extended Markup Language (XML), KML is a very broad language allowing significant user flexibility to define the form of a data product. KML can be used to create semi-structured spatial data for use in mapping applications. ESRI's ArcMAP is a Geographic Information System (GIS) that provides the ability to import/export, display and perform numeric analysis on geospatial data. Both geospatial display software and GIS are used extensively for the creation of geospatial products; however, GIS applications typically has limited capability to properly import/export semi-structured spatial data.

SUMMARY

Embodiments relate to converting semi-structured spatial data. Initially, semi-structured spatial data is recursively traversed to determine a dynamically nested structure. The dynamically nested structure is translated into an application specific layer structure based on feature type grouping and display capabilities of a geographic information system (GIS) application. Next, an input symbology is determined for each feature in the semi-structured spatial data. The input symbology of each feature is analyzed to determine an application symbology for each map layer in the GIS application. A spatial database is created for the GIS application based on the application specific layer structure. The features are translated from the semi-structured spatial data into the spatial database, and the application symbology of each map layer is used to render the features in the GIS application.

DESCRIPTION

Embodiments of the invention retain full data control and functionality of semi-structured data, as designed by the creator of the data product, so that the data product behaves identically in geospatial display software and GIS. In contrast, existing KML import functionality consolidates all objects from a KML file into a single consolidated data layer, which results in the loss of the user's ability to control individual data elements within the KML file, such as color, symbology, layer depth, line style, etc.

Proper retention and control of data element characteristics as designed by the creator the data product is essential for the proper communication of information represented by the data. Embodiments of the invention provide the ability to retain full functionality for each data element whether it was originally created as a product for geospatial display software or as a product for GIS. A few high-level capabilities that this invention provides that existing import functions lacks:

Maintaining the original (as in KML) folder structure, i.e. Table of Contents. Typically, features are imported into a single layer in a GIS application, which eliminates the ability to independently control each layer (on/off and other attributes) as originally designed by the creator of the KML data product.

Maintaining the feature symbology (e.g., color, icons, etc.) assignments as designated in the KML data product.

Retaining mouse over map tip functionality.

Handling multiple feature types (e.g., point, line, polygon, etc.) within one group layer while retaining independent control of symbology for each feature.

Figure 1:
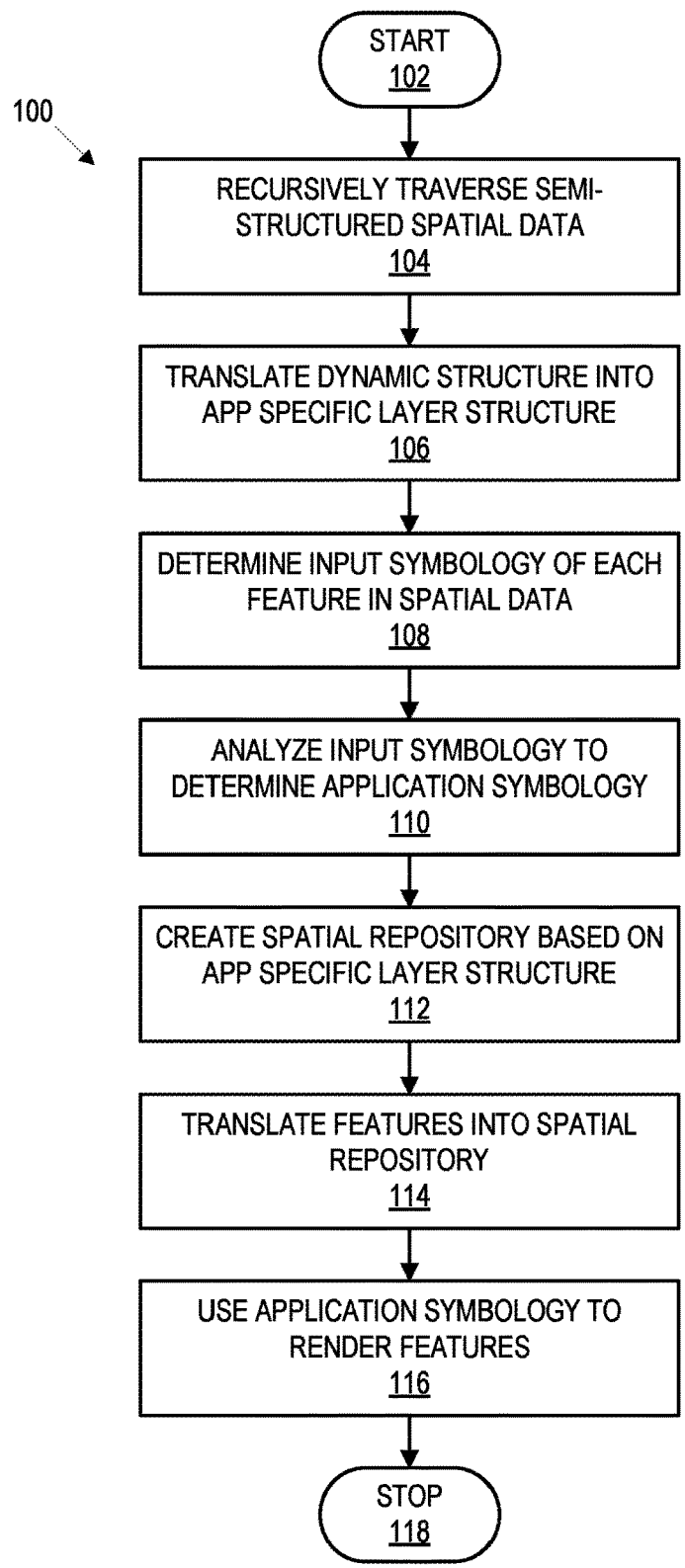
FIG. 1 is an example workflow for semi-structured spatial data conversion.

FIG. 1 is an example workflow 100 for semi-structured spatial data conversion. As is the case with the other processes described herein, various embodiments may not include all of the steps described below, may include additional steps, and may sequence the steps differently. Accordingly, the specific arrangement of steps shown in FIG. 1 should not be construed as limiting the scope of semi-structured spatial data conversion.

In block 102, the workflow 100 starts and proceeds to block 104, where semi-structured spatial data is recursively traversed to determine a dynamically nested structure. For example, the semi-structured data can be KML, which allows for a data hierarchy to be defined in KML tags as folders. In this example, the folders can define a dynamically nested structure for grouping and organizing spatial data. The dynamically nested structure can be determined by the grouping and display capabilities of an originating geospatial display application.

In block 106, the dynamic nested structure is translated into an application specific layer structure. The application specific layer structure can be determined based on grouping and display capabilities of a target GIS application. For example, the GIS application may allow for group layers. In another example, the GIS application may allow for layers with multiple feature types. The translation of the dynamic nested structure can be performed using a translation matrix, which identify matching features and functionality between, for example, the KML language and the GIS application.

In block 108, input symbology is determined for each feature in the semi-structured data. For example, the originating geospatial display application may allow a user to define a distinct symbology for each feature. Symbology describes how a feature should be rendered in the geospatial display application. If the feature is a point, the symbology can describe the shape and color of the point, how a label for the point should be displayed, etc.

In block 110, the input symbology is analyzed to determine a corresponding application symbology in the target GIS application. Because input symbology can be defined on individual features, groups of features, and/or for entire folders, the input symbology of the semi-structured data should be processed such that commonalities between features should be accounted for by the analysis so that, for example, features that share a symbology are assigned the same symbology identifier with respect to the target GIS application.

Blocks 108 and 110 can be applied to different types of symbology in the semi-structured spatial data. Examples of types of symbology include, but are not limited to:
- Features referencing symbology defined at a document level
- Features referencing symbology assigned through a custom "mapping" to document level defined symbology
- Symbology individually defined for each feature (which needs to be condensed to each unique symbology definition for ArcMap)

Further, characteristics of the input symbology and the target symbology may differ and be accounted for by the preceding steps. For example, the semi-structured spatial data may have a AABBGGRR color space that is converted to a RRGGBB color space plus a transparency in the target symbology. In another example, a shape in the semi-structured spatial data that doesn't exist in the GIS application can be mapped to a similar shape that is supported by the GIS application. In yet another example, the semi-structured spatial data and GIS application may have different metrics for specifying symbology size that should be taken into account.

In some cases, the generated application symbologies can be stored as metadata, which can then be used below in block 116 to render the features. For example, the metadata can be generated as part of a project file in ArcMap.

In block 112, a spatial database is created based on the application specific layer structure. The spatial database is created so that it preserves the dynamic nested structure of the semi-structured data. For example, folders from Google Earth can be represented as group layers in ArcMap, where each group layer includes multiple feature layers for each type of data element (e.g., point, line, polygon, etc.). In this example, the hierarchy of the data is maintained while accounting for the ArcMap limitation of only one feature type allowed for a feature layer.

In block 114, the features of the semi-structured data are translated into the spatial database. Specifically, spatial data from the KML file can be converted to spatial features, which are then imported into the spatial database. Spatial data is typically stored in KML files as textual coordinate data. For example, a polygon can be stored as a sequence of coordinates, which can be used to build a polygon feature to be imported into the spatial database.

In block 116, the application symbology is used to render the features from the spatial database in a GIS application. The application symbology can be stored as metadata, which is used by the GIS application to render the features as they are loaded. For example in ArcMap, the application symbology can be stored in a project file that also includes references to layers in the spatial database. Workflow 100 can then stop in block 118.

Figure 2:
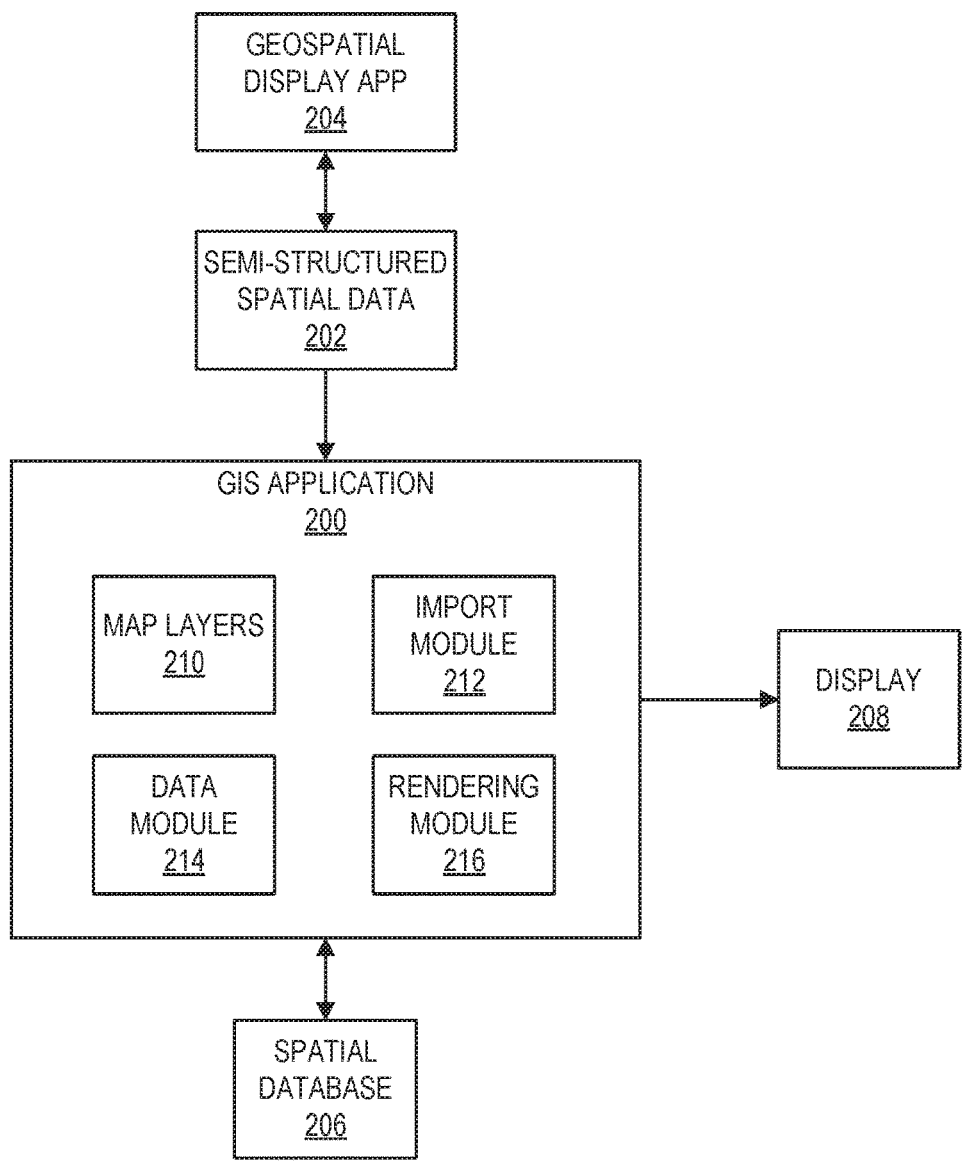
FIG. 2 is a diagram of an example system for semi-structured spatial data conversion.

FIG. 2 is a diagram of an example system for semi-structured spatial data conversion. The system of this example includes a GIS application 200, semi-structured spatial data 202, a map application 204, a spatial database 206, and a display 208.

GIS application 200 is configured to perform spatial analytics on spatial data stored in a spatial database 206. Examples of a GIS application 200 include, but are not limited to, ESRI ArcMap, Autodesk AutoCAD, Mapinfo, etc. GIS application 200 executes on a computer system with a display 208 for displaying spatial data and analysis results. Spatial data in spatial database 206 can be imported from semi-structured spatial data 202. The semi-structured spatial data 202 is exported from a geospatial display application 204.

Geospatial display application 204 is configured to display spatial data and generate maps. Examples of a geospatial display application 204 are Google Earth, Google Maps, etc. Geospatial display application 204 is configured to export spatial data as semi-structured spatial data 202. The semi-structured spatial data 202 is compliant with an open standard such as KML. KML is an XML-based language for facilitating the display geospatial data. KML has been accepted as an Open Geospatial Consortium (OGC) standard and is supported by a variety of geospatial display applications.

GIS application 200 includes map layers 210, import module 212, data module 214, and rendering module 216. Map layers 210 are representations of spatial data tables in the spatial database 206. Map layers 210 can include group layers, feature layers (e.g., point, line, polygon, etc.), data layers, raster layers, etc. Map layers 210 can be configured by a user of GIS application 200 to perform data analysis. Map layers 210 can include metadata that describes the symbology of the spatial data displayed by GIS application 200.

In some cases, spatial database 206 can be a geodatabase. An ArcMap geodatabase is a collection of geographic datasets of various types held in a common file system folder, a file- based database, or a relational database management system (e.g., Oracle, Microsoft SQL Server, PostgreSQL, etc.). A geodatabase is a native data format that is optimized for use in ArcMap.

Import module 212 is configured to import semi-structured spatial data 202 into the spatial database 206. Specifically, import module 212 can import semi-structured spatial data 202 as described above with respect to FIG. 1. Import module 212 may allow for a user of GIS application 200 to specify parameters for the import.

Data module 214 is configured to perform data analytics on spatial data in spatial database 206. Examples of data analytics include, but are not limited to, routing, pattern detection, identifying spatial relationships, etc.

Rending module 216 is configured to render spatial data and analytic results on the display 208. The spatial data and analytic results can be rendered according to symbology stored in the map layers 210.

Figure 3A:
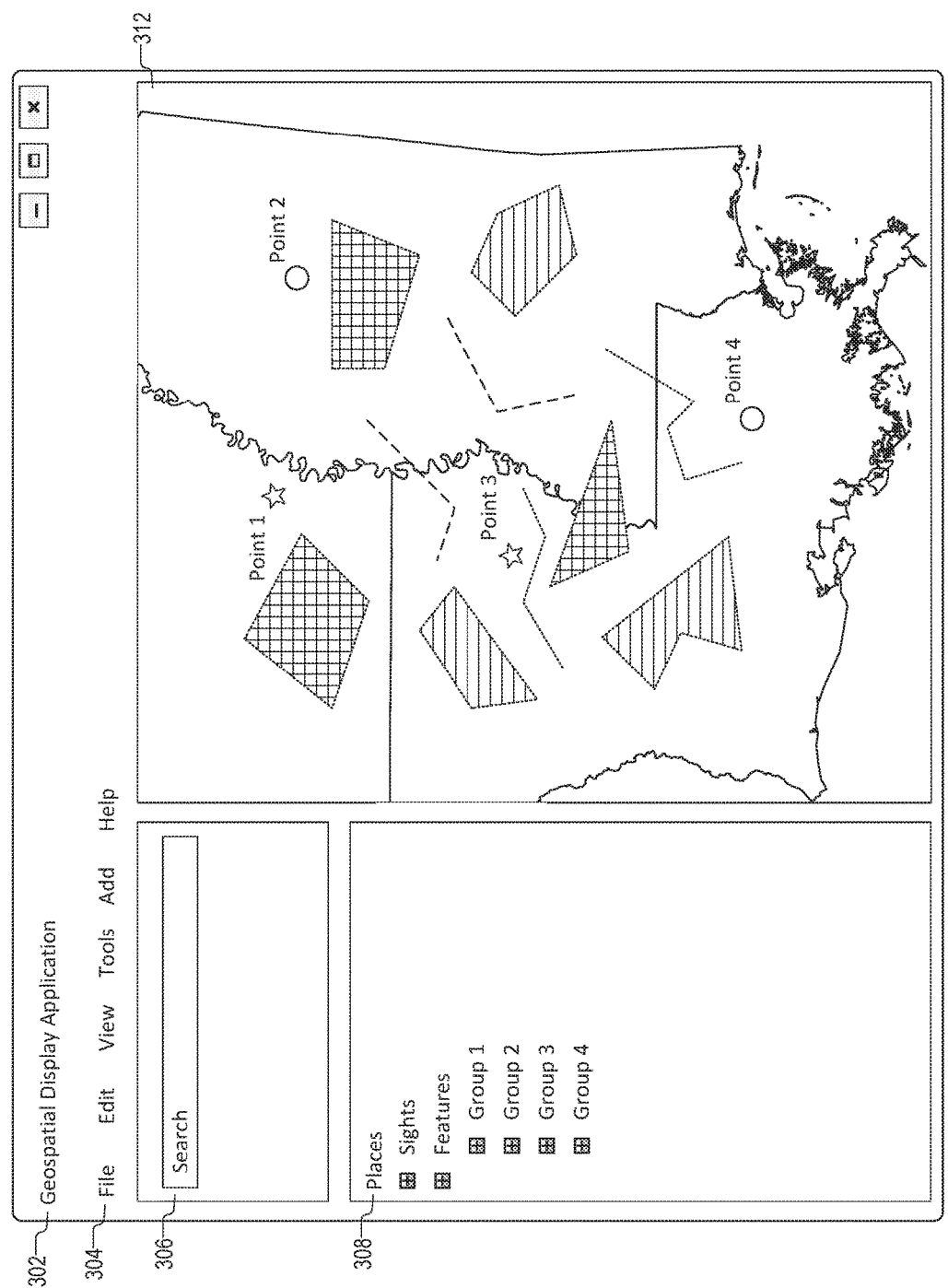
FIGS. 3A-3E are example user interfaces of geospatial display software that includes semi-structured spatial data.

FIGS. 3A-3E are example user interfaces 302 of geospatial display software that includes semi-structured spatial data. In FIG. 3A, the geospatial display application user interface 302 includes a menu bar 304, a search box 306, a places pane 308, and a map display 312. In this example, four feature folders labeled Group 1, Group 2, Group 3, and Group 4 are shown in the places pane 308. Each feature folder includes features as described below with respect to FIGS. 3B-3E.

Figure 3B:
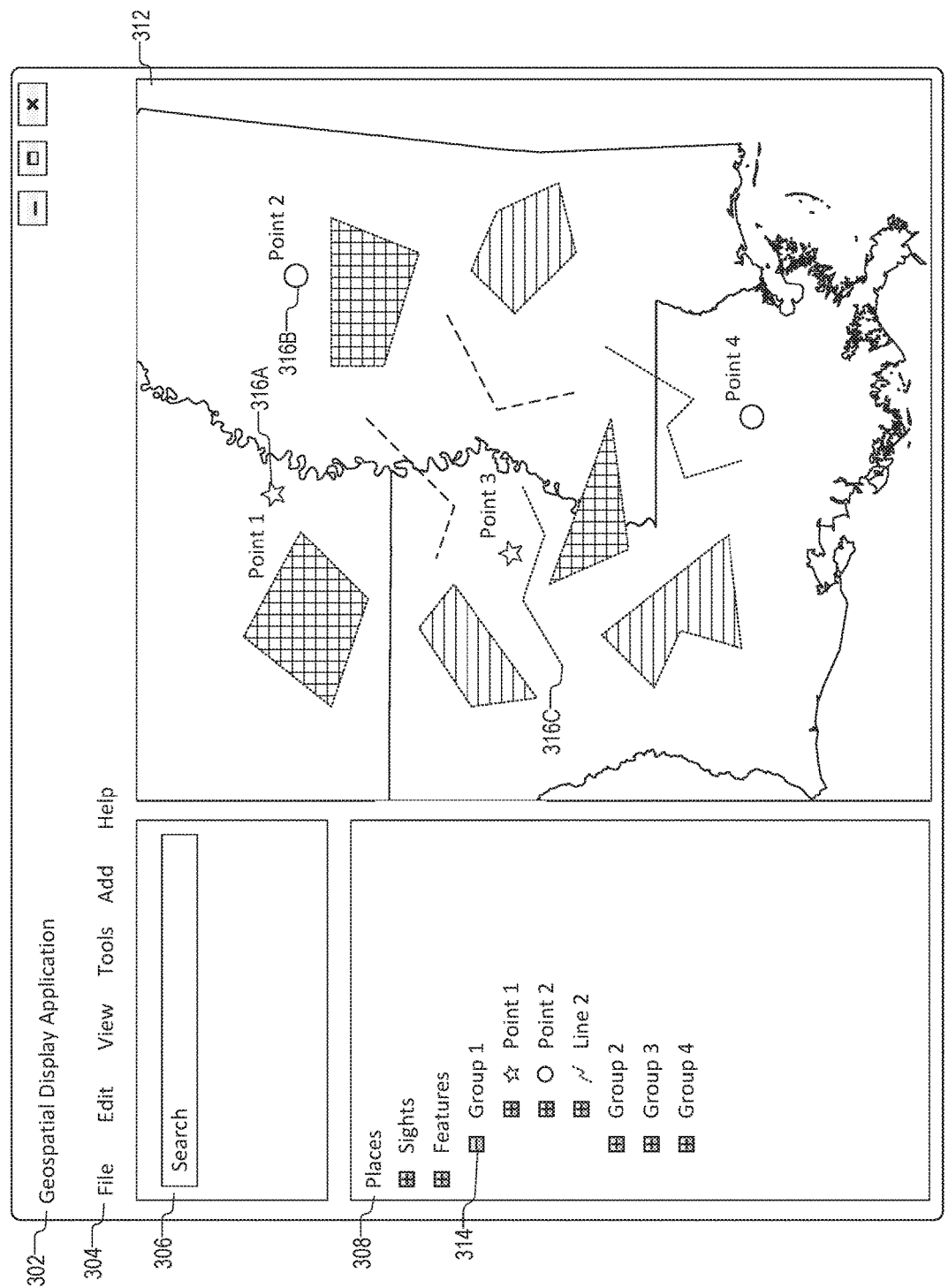

In FIG. 3B, Group 1 314 in the places pane 308 is expanded to show the features of Group 1 314. Group 1 314 includes Point 1 316A, Point 2 316 B, and Line 2 316C. The features of Group 1 314 can be logically related and of multiple feature types (i.e., points and lines). Examples of logical relationships for groups of features include time-sensitive datasets, geographically distinct datasets, etc. Further, Point 1 316A is represented as a star while Point 2 316B is represented as a circle, which shows that each feature can have a unique symbology. Line 2 316C is represented as a dashed line.

Figure 3C:
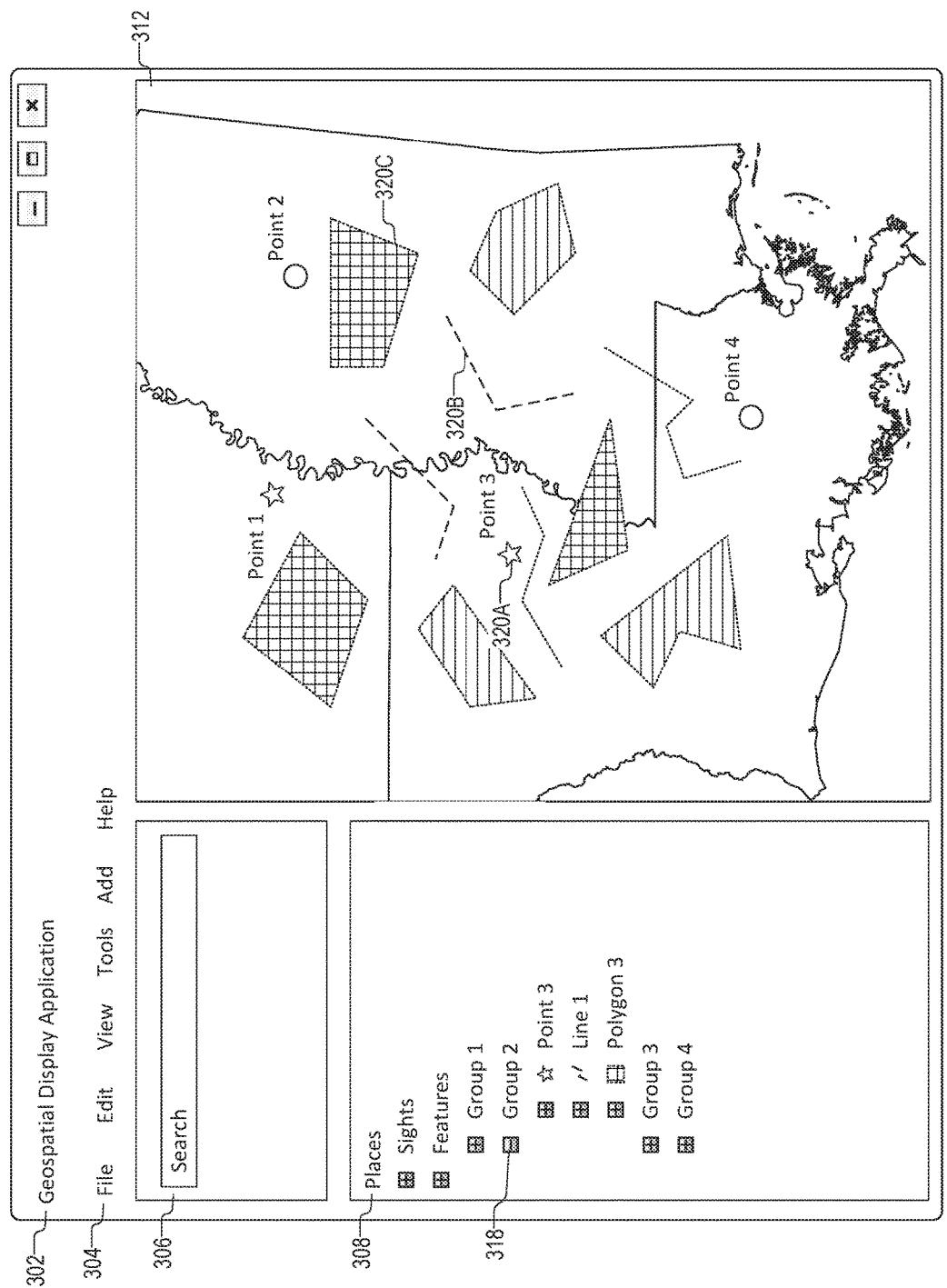

In FIG. 3C, Group 2 318 in the places pane 308 is expanded to show the features of Group 2 318. Group 2 318 includes Point 3 320A, Line 1 320B, and Polygon 3 320C. Point 3 320A is represented as a star, which shares input symbology with Point 1 316A of FIG. 3B. Line 1 320B is represented as a dashed line. Polygon 3 320C is represented by a cross-hatch polygon. Similar to Group 1 314 of FIG. 3B, Group 2 316 includes multiple features types with independent symbologies.

Figure 3D:
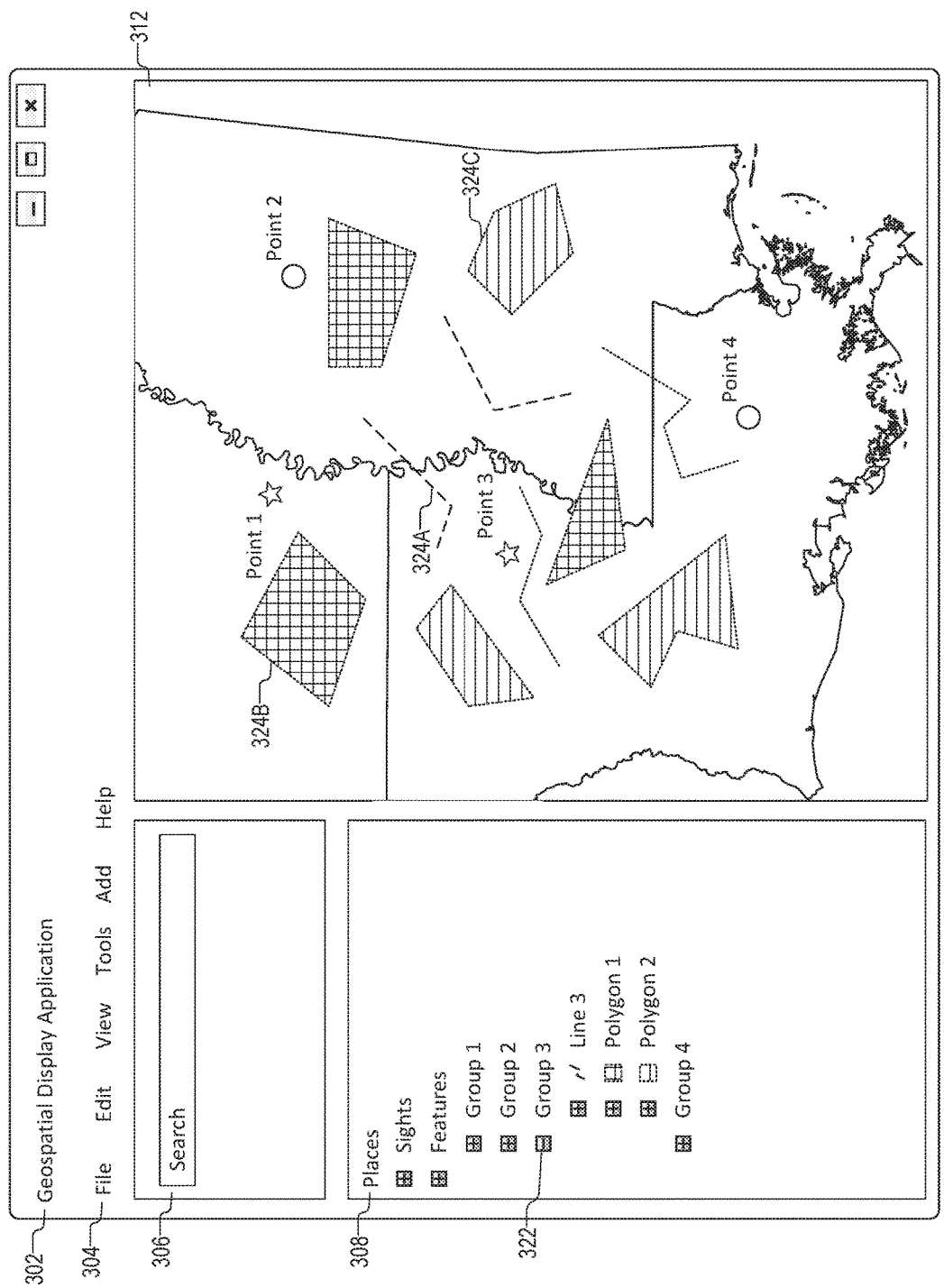

In FIG. 3D, Group 3 322 in the places pane 308 is expanded to show the features of Group 3 322. Group 3 322 includes Line 3 324A, Polygon 1 324B, and Polygon 2 324C. Line 3 324A is represented by a dashed line, Polygon 1 324B is represented by a cross-hatch polygon, and Polygon 2 324C is represented by a hatch polygon.

Figure 3E:
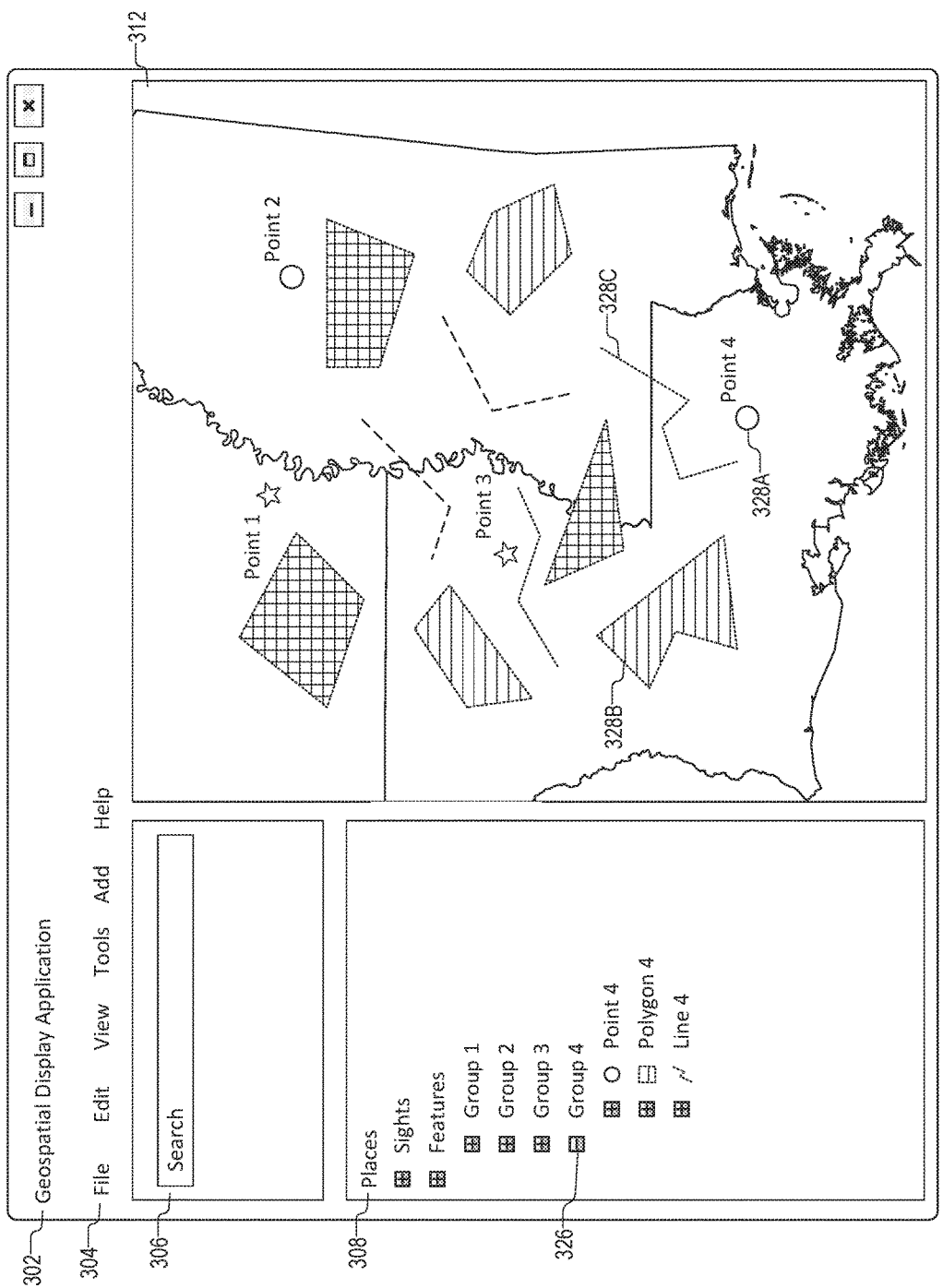

In FIG. 3E, Group 4 326 in the places pane 308 is expanded to show the features of Group 4 326. Group 4 326 includes Point 4 328A, Polygon 4 328B, and Line 4 328C. Point 4 328A is represented by a circle, Polygon 4 328B is represented by a hatch polygon, and Line 4 328C is represented by a dotted line.

Figure 4:
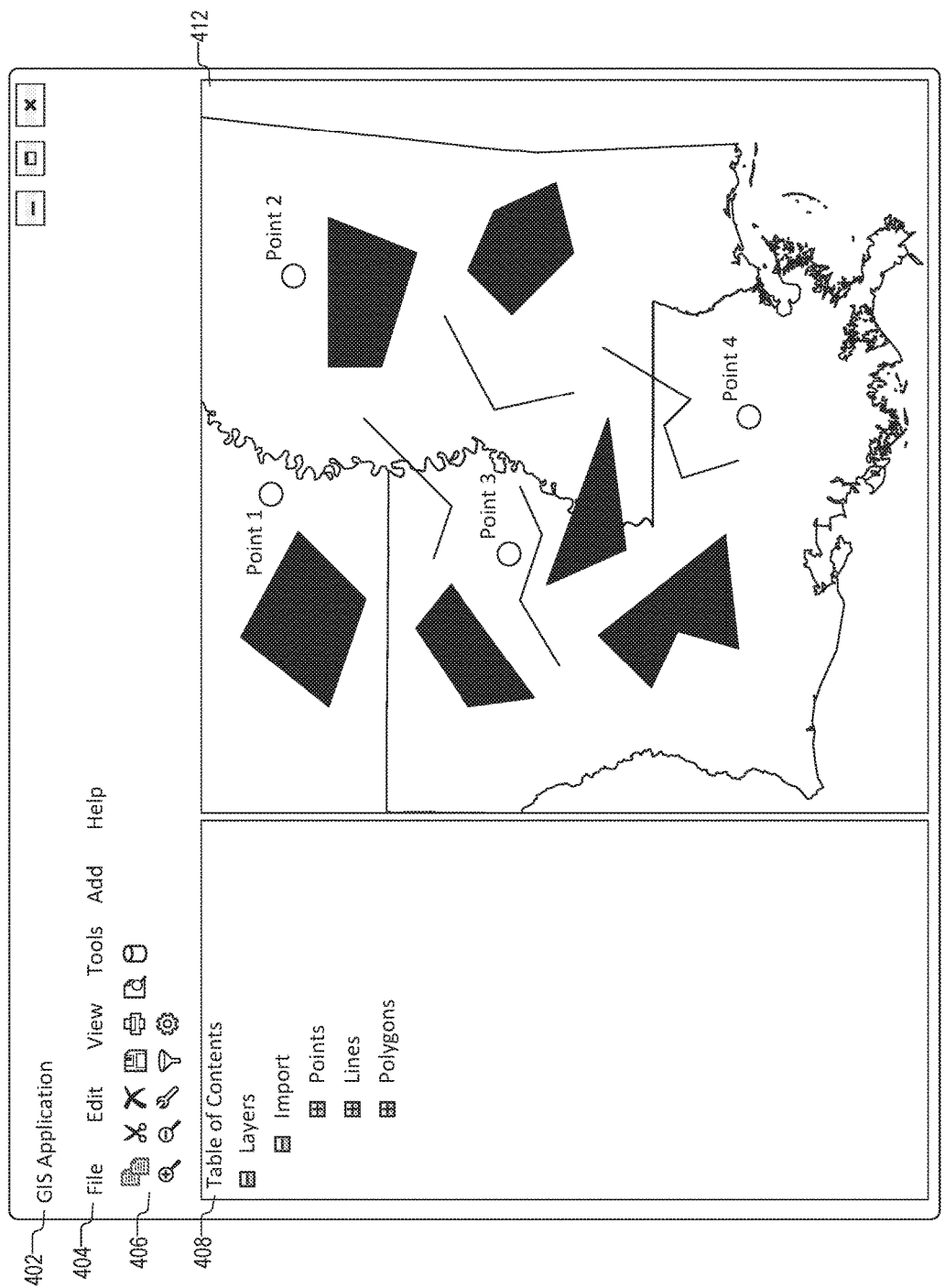
FIG. 4 (PRIOR ART) is an example user interface of a GIS application that includes semi-structured spatial data.

FIG. 4 is an example user interface 402 of a GIS application that shows a typical import of semi-structured spatial data. The GIS application user interface 402 includes a menu bar 404, a toolbar 406, a table of contents 408, and a map display 412. In this example, the table of contents 408 shows an Import group layer that includes three feature layers. The three feature layers are grouped by feature type, resulting in a Points layer, a Lines layer, and a Polygons layer. Accordingly, the logical groups discussed above with respect to FIGS. 3A-3E no longer exist; thus, the features in the original four groups have been mixed and redistributed into three new groups. Further, the symbology of each feature in the semi-structured spatial data is no longer shown because the GIS application applied a default symbology to each of the features.

FIGS. 5A-5D are example user interfaces of a GIS application that includes imported semi-structured spatial data according to embodiments of the invention. For example, the semi-structured spatial data could have been imported into a spatial database as described above with respect to FIG. 1. The GIS application user interface 502 includes a menu bar 504, a toolbar 506, a table of contents 508, and a map display 512. In this example, the table of contents 508 shows an Import group layer that includes four additional group layers for Group 1, Group 2, Group 3, and Group 4. Each of the group layers corresponds to a group folder as described above with respect to FIGS. 3B-3E.

Figure 5A:
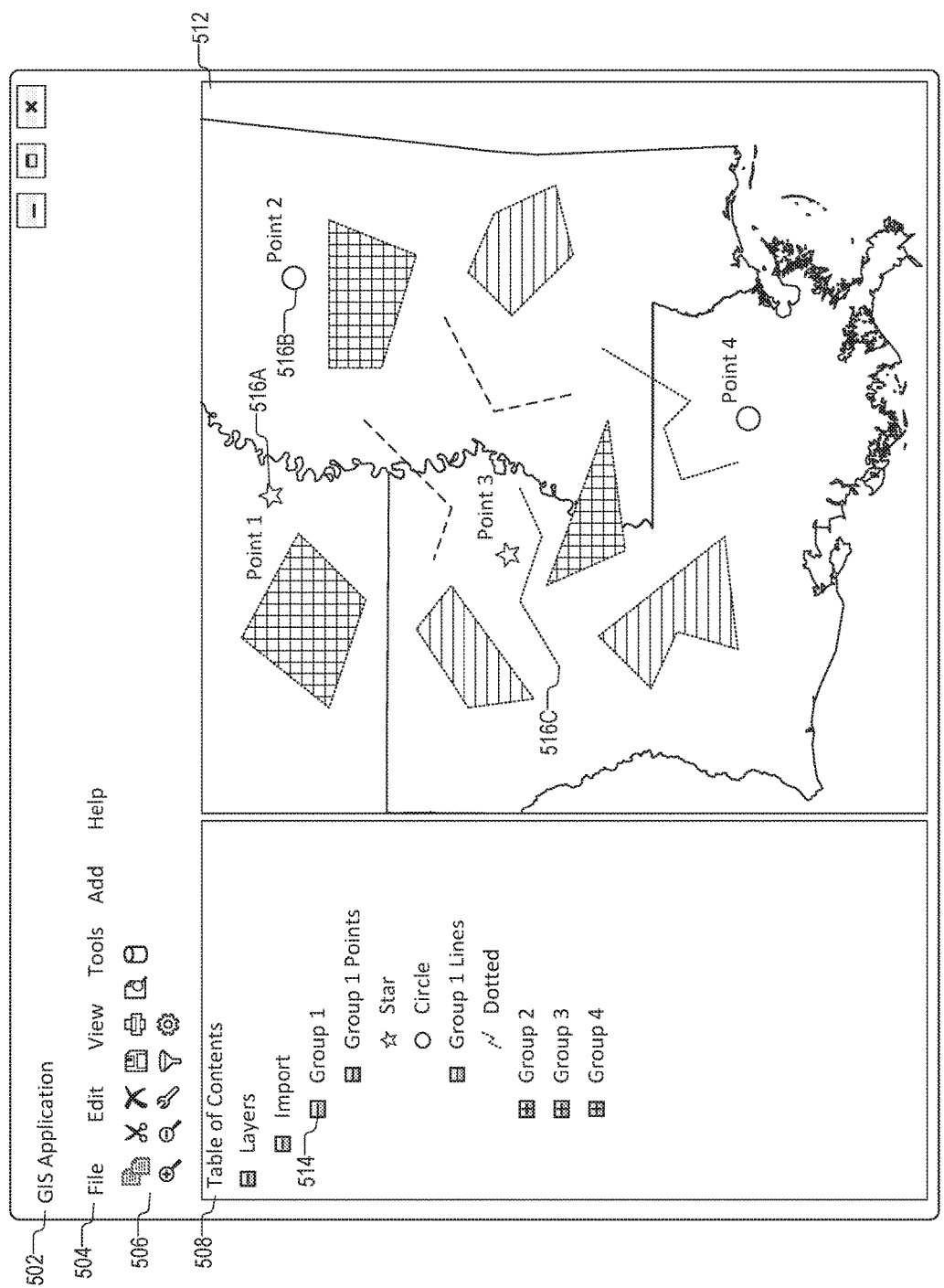
FIGS. 5A-5D are example user interfaces of a GIS application that includes imported semi-structured spatial data according to embodiments of the invention.

In FIG. 5A, Group 1 514 in the table of contents 508 is expanded to show two feature layers in Group 1 514. Each feature type has its own nested feature layer because the GIS application only supports one feature type per feature layer. The Group 1 Points feature layer includes Point 1 516A and Point 2 516 B, and the Group 1 Lines feature layer includes Line 2 516C. The features of Group 1 514 are logically related in the same manner as the features in Group 1 314 of FIG. 3B, thereby maintaining the logical relationships specified by the creator of the original semi-structured spatial data. Further, the application symbology of each feature in Group 1 514 matches the input symbology shown in FIG. 3B.

Figure 5B:
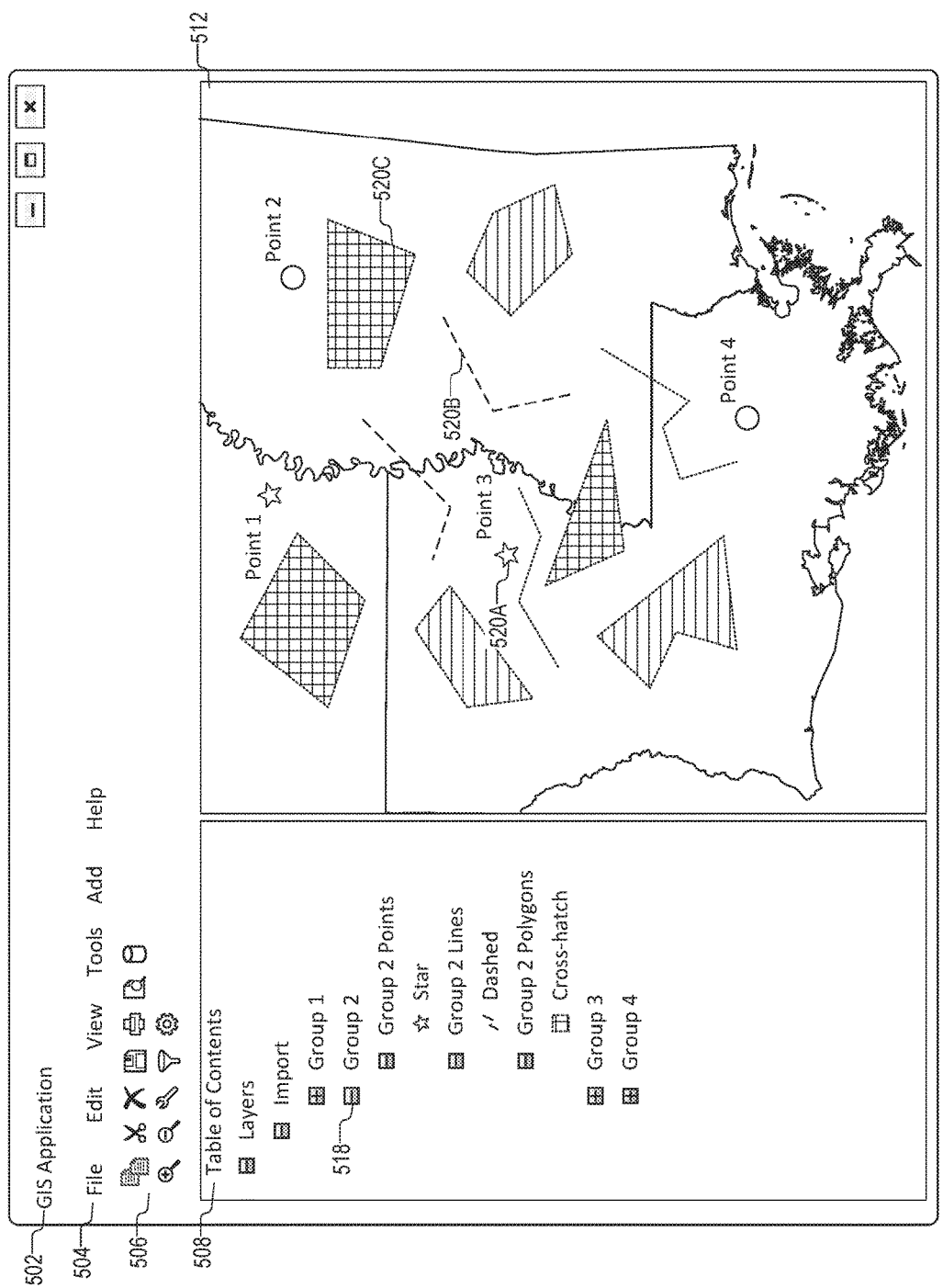

In FIG. 5B, Group 2 518 in the table of contents 508 is expanded to show three feature layers in Group 2 518. The Group 2 Points feature layer includes Point 3 520A, the Group 2 Lines feature layer includes Line 1 520B, and the Group 2 Polygons layer includes Polygon 3 520C. Similar to Group 1 514 of FIG. 5A, Group 2 516 is a group layer includes multiple features types via the feature layers with independent symbologies.

Figure 5C:
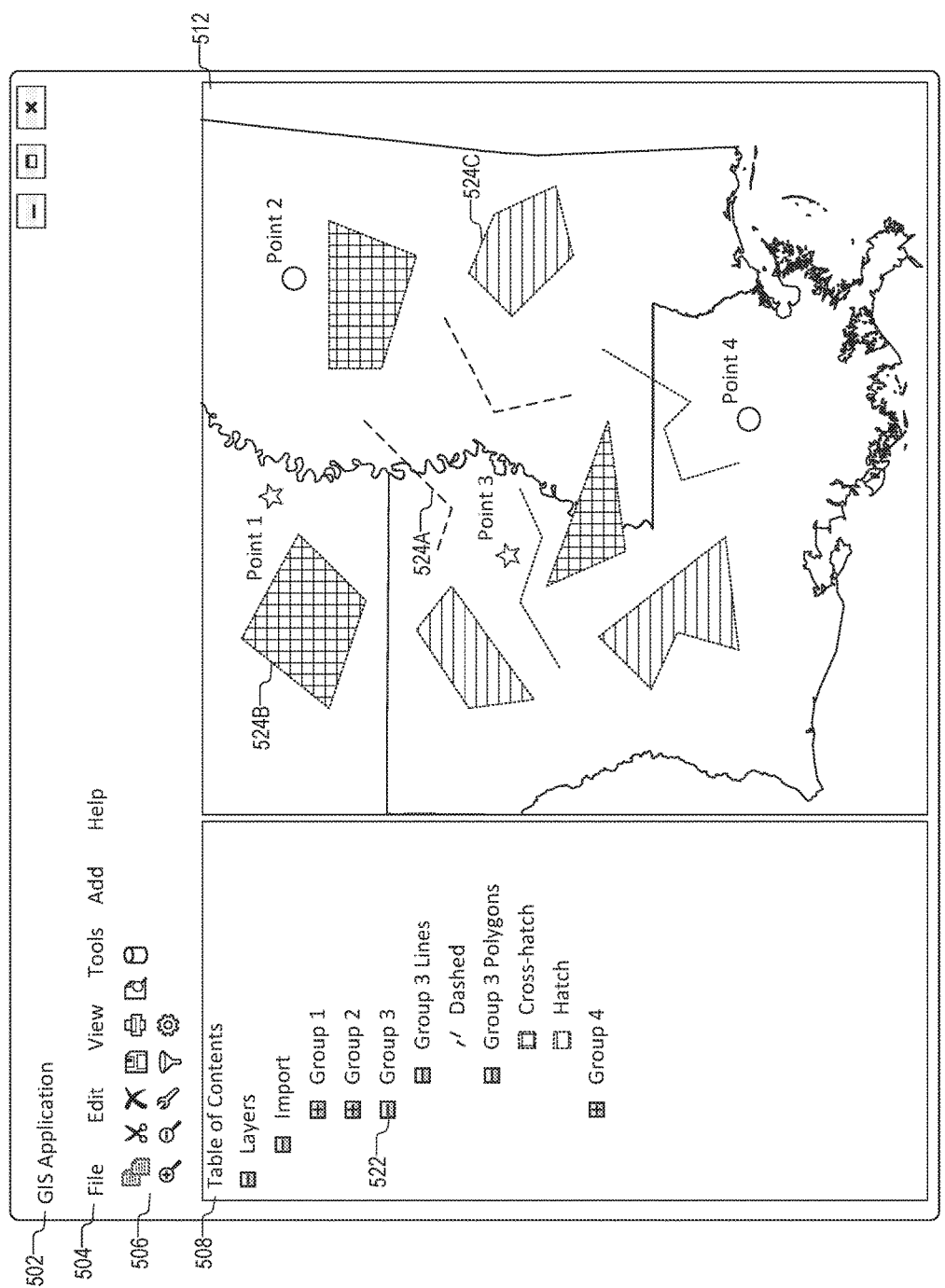

In FIG. 5C, Group 3 522 in the table of contents 508 is expanded to show the two feature layers in Group 3 522. The Group 3 Lines feature layer includes Line 3 524A, and the Group 3 Polygons layer includes Polygon 1 524B and Polygon 2 524C.

Figure 5D:
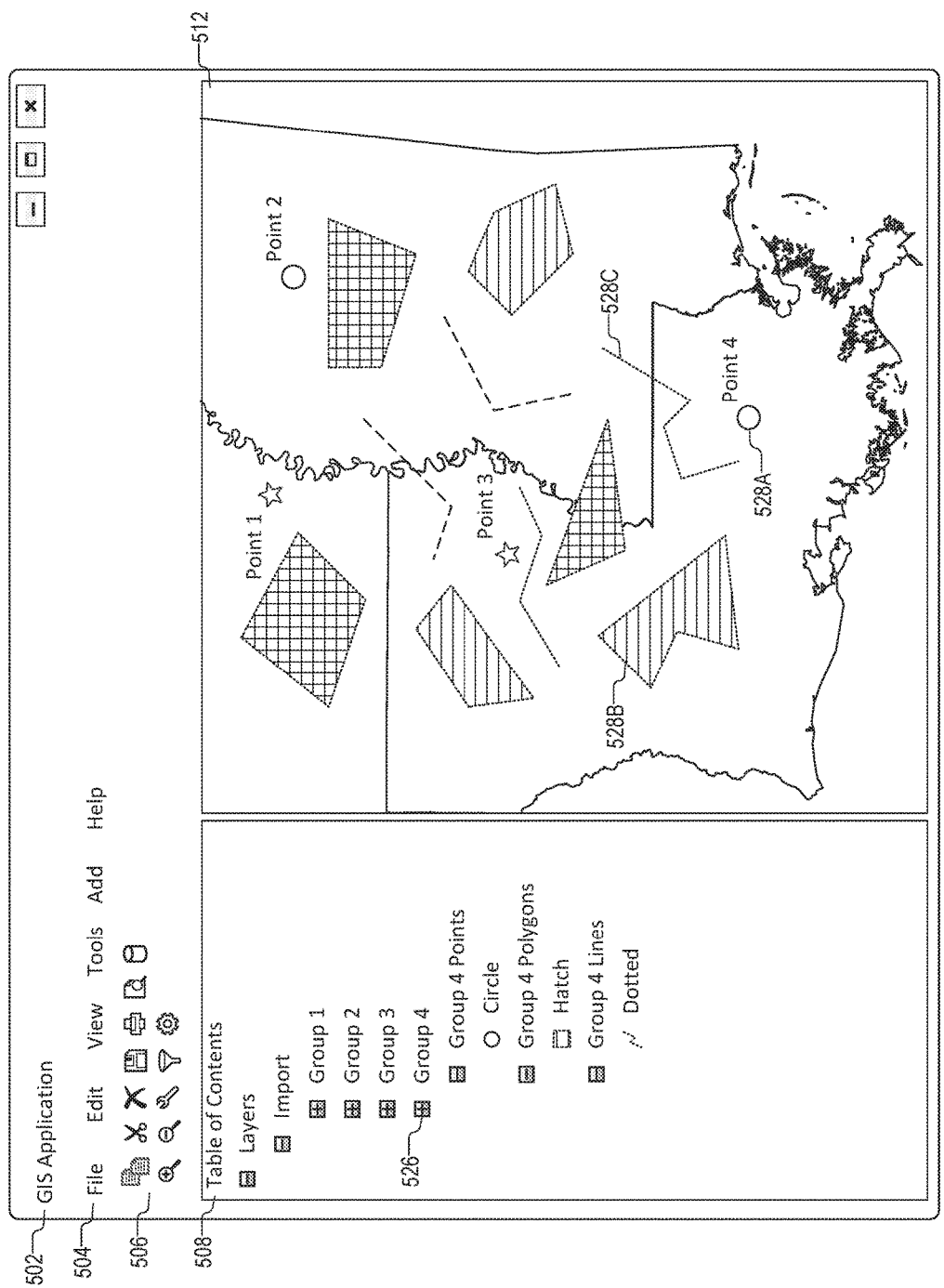

In FIG. 5D, Group 4 526 in the table of contents 508 is expanded to show three feature layers in Group 4 526. The Group 4 Points feature layer includes Point 4 528A, the Group 4 Lines feature layer includes Line 4 528C, and the Group 4 Polygons layer includes Polygon 4 528B.

In each of the above examples, the dynamically nested structure and the input symbologies of the semi-structured spatial data is accounted for to preserve the logical relationships and appearance specified by the creator.

Figure 6:
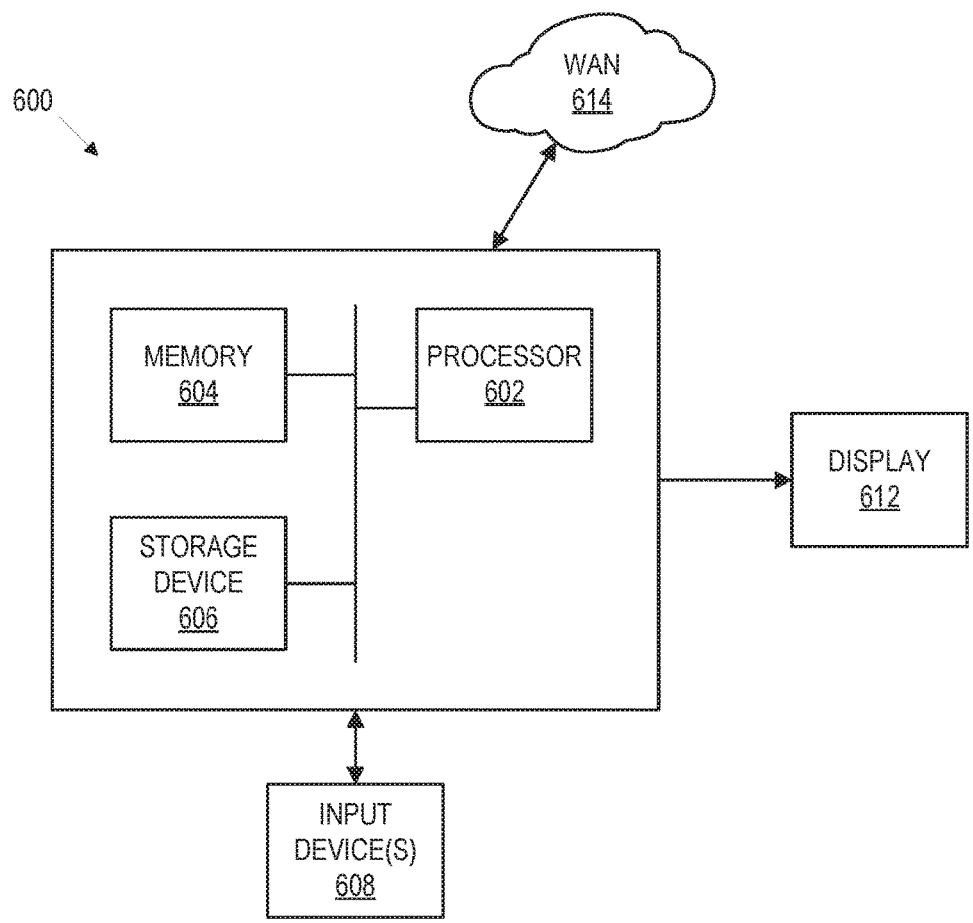
FIG. 6 is a diagram of an example computer system for semi-structured spatial data conversion.

The invention may be implemented on virtually any type of computer regardless of the platform being used. For example, as shown in FIG. 6, a computer system 600 includes a processor 602, associated memory 604, a storage device 606, and numerous other elements and functionalities typical of today's computers (not shown). The computer 600 may also include input means 608, such as a keyboard and a mouse, and output means 612, such as a monitor. The computer system 600 may be connected to a local area network (LAN) or a wide area network (e.g., the Internet) 614 via a network interface connection (not shown). Those skilled in the art will appreciate that these input and output means may take other forms.

Further, those skilled in the art will appreciate that one or more elements of the aforementioned computer system 600 may be located at a remote location and connected to the other elements over a network. Further, the invention may be implemented on a distributed system having a plurality of nodes, where each portion of the invention (e.g., image module, controller, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

The invention claimed is:

1. A method for converting semi-structured spatial data, the method comprising:
    recursively traversing the semi-structured spatial data to determine a dynamically nested structure;
    translating the dynamically nested structure into an application specific layer structure based on feature type grouping and display capabilities of a geographic information system (GIS) application;
    determining an input symbology of each feature of a plurality of features in the semi-structured spatial data;

analyzing the input symbology of each feature of the plurality of features to determine an application symbology for each map layer of a plurality of map layers in the GIS application;

creating a spatial database for the GIS application based on the application specific layer structure;

translating the plurality of features from the semi-structured spatial data into the spatial database; and using the application symbology of each map layer of the plurality of map layers to render the plurality of features in the GIS application.

2. The method of claim 1, wherein the semi-structured spatial data is compatible with a keyhole markup language.

3. The method of claim 1, wherein the spatial database is a geodatabase.

4. The method of claim 1, further comprising:

generating metadata based on the application symbology of each map layer of the plurality of map layers, wherein the metadata is used to render the plurality of features.

5. The method of claim 1, wherein the input symbology comprises an input color and the application symbology comprises an application color, the method further comprising:

mapping the input color from a first color space of the semi-structured spatial data to a second color space of the GIS application to determine the application color.

6. A non-transitory computer-readable medium comprising executable instructions for causing a computing device to:

recursively traverse semi-structured spatial data to determine a dynamically nested structure;

translate the dynamically nested structure into an application specific layer structure based on feature type grouping and display capabilities of a geographic information system (GIS) application;

determine an input symbology of each feature of a plurality of features in the semi-structured spatial data;

analyze the input symbology of each feature of the plurality of features to determine an application symbology for each map layer of a plurality of map layers in the GIS application;

create a spatial database for the GIS application based on the application specific layer structure;

translate the plurality of features from the semi-structured spatial data into the spatial database; and using the application symbology of each map layer of the plurality of map layers to render the plurality of features in the GIS application.

7. The non-transitory computer-readable medium of claim 6, wherein the semi-structured spatial data is compatible with a keyhole markup language.

8. The non-transitory computer-readable medium of claim 6, wherein the spatial database is a geodatabase.

9. The non-transitory computer-readable medium of claim 6, further comprising:

generating metadata based on the application symbology of each map layer of the plurality of map layers, wherein the metadata is used to render the plurality of features.

10. The non-transitory computer-readable medium of claim 6, wherein the input symbology comprises an input color and the application symbology comprises an application color, the method further comprising:

mapping the input color from a first color space of the semi-structured spatial data to a second color space of the GIS application to determine the application color.

11. A system comprising:

memory for storing semi-structured spatial data;

a spatial database for storing a plurality of features;

a processor operatively connected to the memory, the processor for executing a conversion module to:

recursively traverse the semi-structured spatial data to determine a dynamically nested structure;

translate the dynamically nested structure into an application specific layer structure based on feature type grouping and display capabilities of a geographic information system (GIS) application;

determine an input symbology of each feature of the plurality of features in the semi-structured spatial data;

analyze the input symbology of each feature of the plurality of features to determine an application symbology for each map layer of a plurality of map layers in the GIS application;

create a spatial database for the GIS application based on the application specific layer structure;

translate the plurality of features from the semi-structured spatial data into the spatial database; and using the application symbology of each map layer of the plurality of map layers to render the plurality of features in the GIS application; and a computer display to display the plurality of features.

12. The system of claim 11, wherein the semi-structured spatial data is compatible with a keyhole markup language.

13. The system of claim 11, wherein the spatial database is a geodatabase.

14. The system of claim 11, wherein the processor is further to:

generate metadata based on the application symbology of each map layer of the plurality of map layers, wherein the metadata is used to render the plurality of features.

15. The system of claim 11, wherein the input symbology comprises an input color, an input shape, and an input size and the application symbology comprises an application color, an application shape, and an application size, the processor is further to:

map the input color from a first color space of the semi-structured spatial data to a second color space of the GIS application to determine the application color;

map the input shape of the semi-structured spatial data to the application shape of the GIS application; and map the input size of the semi-structured spatial data to the application size of the GIS application.

* * * * *